US010724359B2

(12) United States Patent
Anno et al.

(10) Patent No.: US 10,724,359 B2
(45) Date of Patent: Jul. 28, 2020

(54) SYSTEM AND METHOD FOR EVENT DETECTION USING STREAMING SIGNALS

(71) Applicant: CONOCOPHILLIPS COMPANY, Houston, TX (US)

(72) Inventors: Phil D. Anno, Houston, TX (US); Hector Klie, Houston, TX (US); Stacey Ramsay, Houston, TX (US)

(*) Notice: Subject to any disclaimer, the term of this patent is extended or adjusted under 35 U.S.C. 154(b) by 158 days.

(21) Appl. No.: 15/185,688

(22) Filed: Jun. 17, 2016

(65) Prior Publication Data
US 2016/0370260 A1 Dec. 22, 2016

Related U.S. Application Data

(60) Provisional application No. 62/182,056, filed on Jun. 19, 2015.

(51) Int. Cl.
E21B 45/00 (2006.01)
G06K 9/00 (2006.01)

(52) U.S. Cl.
CPC ............ *E21B 45/00* (2013.01); *G06K 9/0053* (2013.01)

(58) Field of Classification Search
CPC .............................. G06K 9/0053; E21B 45/00
USPC ........................................................ 702/189
See application file for complete search history.

(56) References Cited

U.S. PATENT DOCUMENTS

| 5,663,894 A * | 9/1997 | Seth ................... G05B 19/4063 702/56 |
| 8,214,163 B2 | 7/2012 | Hertz |
| 9,001,619 B2 * | 4/2015 | Diller ..................... G01V 1/288 367/14 |
| 9,810,803 B2 * | 11/2017 | Vermilye ................. G01V 1/42 |
| 2002/0195276 A1 * | 12/2002 | Dubinsky ............. E21B 44/005 175/40 |
| 2008/0130442 A1 * | 6/2008 | Kikugawa .............. G11B 20/18 369/53.13 |
| 2011/0071766 A1 * | 3/2011 | Dolan .................. G06K 9/0053 702/19 |

(Continued)

FOREIGN PATENT DOCUMENTS

| GB | 2479383 A | 10/2011 |
| WO | 2002038909 A2 | 5/2002 |

(Continued)

OTHER PUBLICATIONS

International Search Report for parent case, App. No. PCT/US2016/038123, dated Sep. 14, 2016.

(Continued)

*Primary Examiner* — Ricky Ngon
(74) *Attorney, Agent, or Firm* — Polsinelli PC

(57) ABSTRACT

Systems and methods compute dysfunctions via amplitude envelopes that deviate from a mean (normal) state behavior. The envelope function is constructed from a recursive application of the maximum signal value within a given window size. The aforementioned operations are causal and computationally affordable as relative short moving windows are required to trail the current point. Therefore, the proposed envelope and dysfunction calculations are amenable for any source of data streams measured at high sample rates. The effectiveness of the computing is validated as representing multiple physics in real time field drilling operations.

13 Claims, 11 Drawing Sheets

(56) References Cited

U.S. PATENT DOCUMENTS

| | | | |
|---|---|---|---|
| 2012/0059521 A1* | 3/2012 | Iversen | E21B 44/00 700/275 |
| 2012/0130693 A1* | 5/2012 | Ertas | E21B 44/00 703/2 |
| 2012/0173196 A1* | 7/2012 | Miszewski | E21B 47/022 702/151 |
| 2014/0288840 A1* | 9/2014 | Vermilye | G01V 1/288 702/16 |
| 2015/0247396 A1* | 9/2015 | Tunc | E21B 44/00 700/275 |

FOREIGN PATENT DOCUMENTS

| | | |
|---|---|---|
| WO | 2011017627 A1 | 2/2011 |
| WO | 2014070207 A1 | 5/2014 |

OTHER PUBLICATIONS

Caetano M. and X. Rodet. Improved Estimation of the Amplitude Envelope of Time-Domain Signals using True Envelope Cepstral Smoothing, IEEE Int. Conf. on Acoustics, Speech and Signal Processing, Czech Republic, 2011.

Gupta, M., C.C. Aggarwal and J. Han. Outlier Detection for Temporal Data: A Survey. IEEE Transactions on Knowledge and Data Engineering, vol. 25, N.1, 2013.

Jonsson, P. and L. Eklund. TIMESAT—A Program for Analysing Time-Series of Satellite Sensor Data. Computer Geosciences, 2004.

Johansson, Mathias—"The Hilbert transform", 1999, Master Thesis, Mathematics/Applied Mathematics, Vaxjo University, 36 pgs.

Mitsa, T.—"Temporal Data Mining", 2010, Chapman & Hall, Chapter 2, (pp. 21-33); 24 pgs.

* cited by examiner

SYSTEM AND METHOD FOR EVENT DETECTION USING STREAMING SIGNALS

CROSS-REFERENCE TO RELATED APPLICATIONS

This application is a non-provisional application which claims benefit under 35 USC § 119(e) to U.S. Provisional Application Ser. No. 62/182,056 filed Jun. 19, 2015, entitled "SYSTEM AND METHOD FOR EVENT DETECTION USING STREAMING SIGNALS," which is incorporated herein in its entirety.

STATEMENT REGARDING FEDERALLY SPONSORED RESEARCH OR DEVELOPMENT

None.

FIELD OF THE INVENTION

The present disclosure relates in general to the field of hydrocarbon drilling. More particularly, but not by way of limitation, embodiments of the present invention relate to a system and method related to drilling dysfunctions.

BACKGROUND OF THE INVENTION

Signal dysfunction, also known as outlier, anomaly, novelty or event detection, represents one of the most challenging subjects in real time data mining due to the difficulties in achieving computational efficiency, causality, and minimum information drift (i.e., time shifting). In the particular case of real time well drilling operation, it is critical to develop mechanisms that are capable of detecting dysfunctions that would eventually lead to costly drill system failures.

BRIEF SUMMARY OF THE DISCLOSURE

The present disclosure addresses limitations in the art by providing a system and method for computing dysfunctions via amplitude envelopes that deviate from a mean (normal) state behavior. The envelope function is constructed from a recursive application of the maximum signal value within a given window size. Analogously, the mean function allows for estimating the normal state of the signal within the same predefined window size. Hence, the sequence of maximum and mean signal values can be successively smoothed out to generate a dysfunction profile that induces minimum model drift. A dysfunction operator is defined as the relative change of the envelope with respect to the mean signal at each temporal point. The aforementioned operations are causal and computationally affordable as relative short moving windows are required to trail the current point. Therefore, the proposed envelope and dysfunction calculations are amenable for any source of data streams measured at high sample rates. The effectiveness of the present invention is validated on several channels representing multiple physics in real time field drilling operations.

The drilling vibration also causes the drill string to deviate from ideal, uniform circular rotations. The mapping of the non-uniform rotations of the drill string leads a better understanding of the dynamics of drill-string dysfunctions. The present invention calls for using measured acceleration data to map the positions of drill-string motions continuously and produces various attributes to quantify the drilling dysfunctions. 2D and 3D visualizations of various dysfunction attributes describes how the vibration affects the drill-string motions. When combined with other information, it may be used to reduce drilling vibration.

The present invention enables the development of efficient and robust workflows for controlling and optimizing well drilling operations in real time. Envelopes provide a meaningful representation for computing dysfunctions and classifying and summarizing signal trends as well. Dysfunctions are critical for proactively detecting events that may lead to equipment failures. In the particular case of real time drilling, results should aid at improving rate of penetration and minimizing well bit failures. Extensions of the present invention could be oriented to impact any automated activity that require an efficient way to determine envelopes and dysfunctions in real time signals as produced by sensors, satellite and other mobile devices.

It is therefore an object of the present invention to provide a method comprising: determining, via a computing device, an amplitude envelope further comprising configuring an envelope function from a recursive application of the maximum signal value within a given window size; configuring, via the computing device, a mean function for estimating the normal state of a signal within said window size; determining in real time, via the computing device, a dysfunction operator to generate a dysfunction profile by comparing said envelope function to said mean function; and mapping, via the computing device, the various attributes of said comparison.

It is another object of the present invention to provide A system, comprising: a processor; a non-transitory storage medium for tangibly storing thereon program logic for execution by the processor, the program logic comprising: determining logic executed by the processor for determining an amplitude envelope further comprising configuring an envelope function from a recursive application of the maximum signal value within a given window size; configuring logic executed by the processor for configuring a mean function for estimating the normal state of a signal within said window size; determining logic executed by the processor for determining, in real time, a dysfunction operator to generate a dysfunction profile by comparing said envelope function to said mean function; and mapping logic executed by the processor for mapping the various attributes of said comparison, said mapping further comprising applying the confirmed dysfunction profile to the activity producing said signal.

Implementations of the present invention can include one or more of the following features: the method may further identify dysfunctions for detecting equipment failure; such equipment may comprise drilling equipment; the signal data comprises acceleration data; the acceleration data may be translated from a local moving coordinate frame to a global stationary coordinate frame; the vector cross product of radial acceleration and axial accelerations can estimate the tangential acceleration; the signal may include: axial vibration, down-hole RPM, down-hole torque, gravitational acceleration, centripetal acceleration, radial acceleration, tangential acceleration, distance from surface, surface RPM, surface torque, hole depth, and rig state.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION OF THE DISCLOSURE

Figure 1:
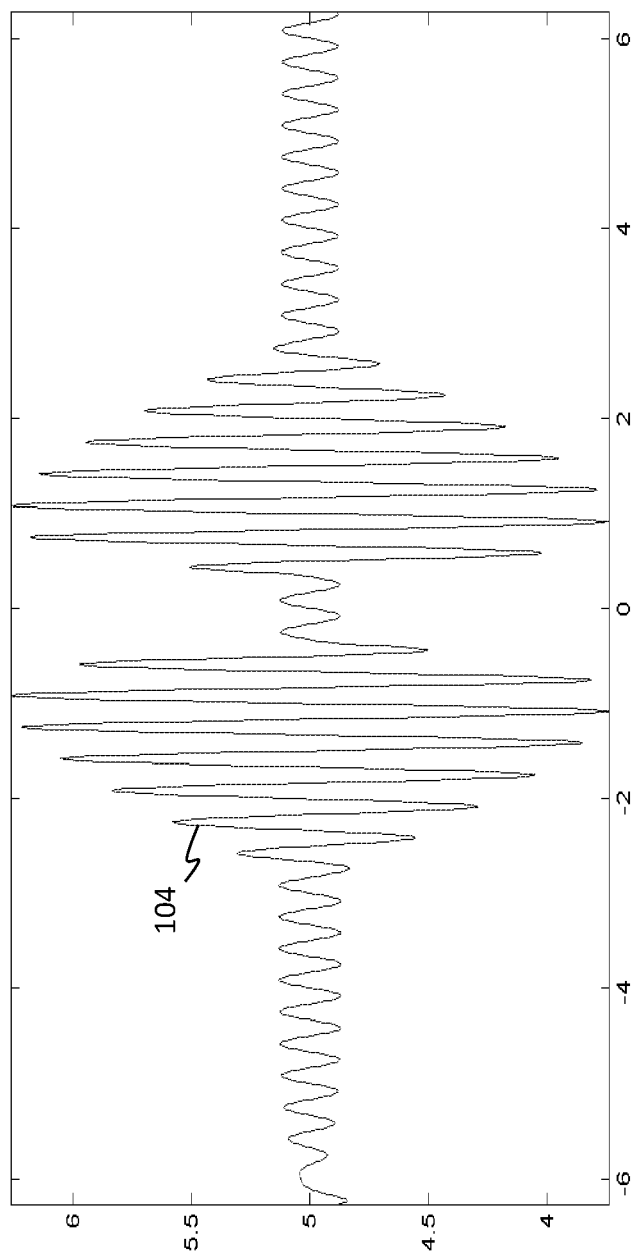
FIG. 1 depicts data representing a time series.

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

While the making and using of various embodiments of the present disclosure are discussed in detail below, it should be appreciated that the present disclosure provides many applicable inventive concepts that can be embodied in a wide variety of specific contexts. The specific embodiments discussed herein are merely illustrative of specific ways to make and use the disclosure and do not limit the scope of the disclosure.

All publications and patent applications mentioned in the specification are indicative of the level of skill of those skilled in the art to which this disclosure pertains. All publications and patent applications are herein incorporated by reference to the same extent as if each individual publication or patent application was specifically and individually indicated to be incorporated by reference.

The present disclosure will now be described more fully hereinafter with reference to the accompanying figures and drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used.

Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of diagrams or operational illustrations, and combinations of blocks in the diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), North American/CEPT frequencies, radio frequencies, single sideband, radiotelegraphy, radioteletype (RTTY), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. Claimed subject matter is intended to cover a wide range of potential variations. For example, a mobile device may include a numeric keypad or a display of limited functionality, such as a monochrome liquid crystal display (LCD) for displaying text. In contrast, however; as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages. The client device, mobile device, or wireless communication device, in accordance with the disclosure may be a portable or mobile telephone including smart phones, a Personal Digital Assistant (PDA), a wireless video or multimedia device, a portable computer, an embedded communication processor or similar wireless communication device. In the following description, the communication device will be referred to generally as User Equipment (UE) for illustrative purposes and it is not intended to limit the disclosure to any particular type of communication device. Certain modern handheld electronic devices (UE) comprise the necessary components to connect to a cellular network, such as a 2G, 2.5G, 3G, and/or LTE network, and the necessary components to connect to a non-cellular IP Connectivity Access Network (IP CAN) such as a wireless LAN network (e.g. IEEE 802.11a/b/g/n) or a wired LAN network (e.g. IEEE 802.3).

Having described the components of the general architecture employed within the disclosed systems and methods, the components' general operation with respect to the disclosed systems and methods will now be described. The principles discussed herein may be embodied in many different forms. The preferred embodiments of the present disclosure will now be described where for completeness; reference should be made at least to FIGS. 1-12.

In the present invention, the efficient calculation of signal envelopes and dysfunctions enables real time data mining, optimization and control of well drilling operations. Nevertheless, the present invention is not limited to the nature of drilling data and it may be applied to other problems as well where proactive detection of temporal events in automated systems may aid in avoiding failures.

The present invention further enables the development of efficient and robust workflows for mining, controlling and optimizing well drilling operations in real time. Envelopes provide a meaningful representation for computing dysfunctions and classifying and summarizing signal trends as well. Dysfunctions are key for proactively detecting events that may lead to equipment failures. In the particular case of real time drilling, results should aid at improving rate of penetration and minimizing well bit failures. Extensions of the present invention could be oriented to impact any automated activity that require an efficient way to determine envelopes and dysfunctions in real time signals as produced by sensor, satellite and cellular devices.

Often, it is desirable to define an envelope, or highest and lowest amplitudes, for all time values of a signal. This envelope can then be used for various calculations, and to interpolate amplitudes for time values in which no sample of the original signal was actually taken. In one embodiment, the present invention provides for a real time and causal envelope calculation similar to those obtained by the Hilbert transform (Johansson, 1999) on large sequences of off-line temporal data. The envelope of the present invention is suitable for efficient dysfunction calculations as the maximum value at any temporal sample is effective to provide an upper bound representation for any signal. Due to the initial resulting envelope having a blocky shape thus resulting to rough for further practical calculations, changes in signal signs require additional treatment as the maximum of a negative value becomes the minimum of the value producing an undesired lower bound to the signal. The first condition can be effectively solved by recursive application of moving average operations. The second condition can be effectively solved by applying the sign function operator upon each maximum calculation.

In another embodiment, other options are provided in the present invention to preserve consistency, boundness and translation invariance to the proposed operators. Dysfunction calculations are possible by aligning the mean calculation and smoothness with the envelope calculation. Given the resulting smoothness of both envelope and mean signals it is then possible to generate a corresponding smooth and dimensionless profile for dysfunctions.

Figure 10:
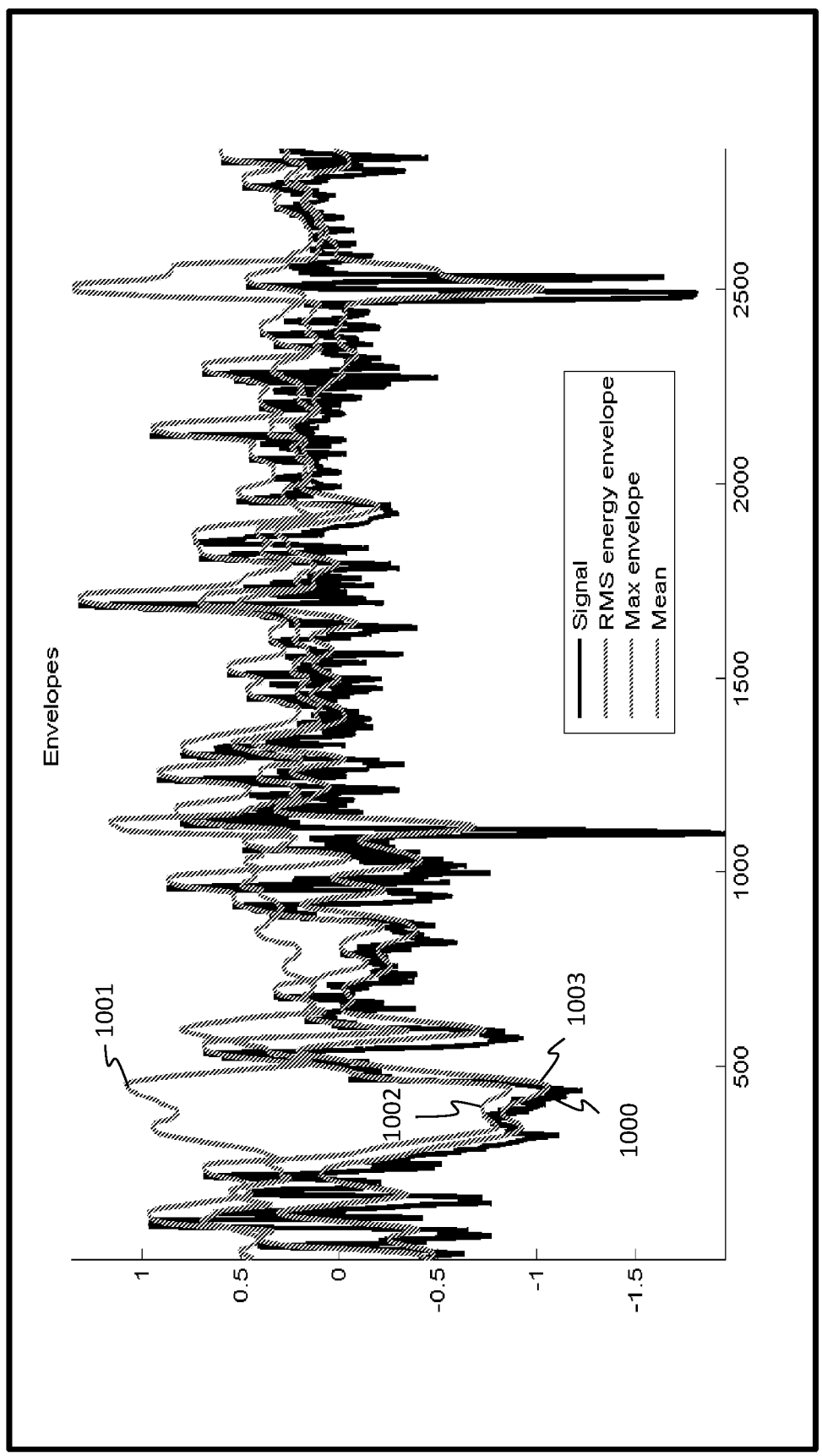
FIG. 10 depicts performance of the present invention when the signal displays frequent changes in sign, as depicted by root mean square (RMS) envelopes.

Most of the literature on temporal data mining on streams is available in the field of computational science where software and hardware technologies associated to sensor measurements have driven the need to better understand the interplay between real time and spatial information. However, most of the proposed mechanisms for real time dysfunction calculations either disregard causality among events (as it may happen in off-line analysis with the use of global spectral or Cartesian interpolation operators; see e.g., Johansson 1999, Jonsson and Eklundh, 2004) or are probabilistic nature (inducing inaccuracies and slowness in predictions from a priori probabilistic distributions or learning kernels) or are computationally demanding (discounting and clustering models), see Gupta et al., 2013. In real time drilling systems, it is critical to be able to detect events a few seconds after they occur. Thus, real time data must be measured at high sampling rates to compensate for delays or driftings induced by signal envelope estimations. The need for higher resolution induces additional challenges for designing real time operators with low floating point and memory requirements. Calculation of envelopes involving low computational operations based on the maximum value and root mean square (RMS) energy has been previously explored in the literature (e.g., Caetano, 2010). However, they have been analyzed in off-line fashion thus assuming that the complete signal profile is already available. FIG. 10 compares the present invention with the RMS energy envelope. It can be observed that the RMS energy has the potential problem of producing a similar response than the mean operator for positive values thus undershooting the expected shape of a reasonable envelope and, in the case of negative values, it can significantly overshoot the envelope. Consequently, the RMS energy operator is not a suitable two-side envelope operator. In real time drilling operations, data may describe significant variations in amplitude, frequency, scale and sign thus imposing strong requirements to develop flexible and robust methodologies for estimating envelopes across a wide range of signal characteristics and trends. These strong requirements are usually overlooked in most, if not all, reported works for envelope calculation. Most methodologies (such as shown in Caetano, 2010) rely on a set of temporal assumptions for which the signal may enter into periods of higher energy and low energy. This indeed allows for the improvement of the quality of envelope calculations but it is currently unfeasible in the type of applications that the present invention is intended to be used for. Recent efforts propose the use of the maximum operations for estimating envelopes on signals such as those observed on oscilloscope devices Hertz, 2012. In the same fashion to the other previous works, this recently proposed procedure is not specifically designed for real time data. In fact, the Hertz, 2012, establishes an iterative estimation of multiple minimum and maximum values followed by numerical interpolation to refine the shape of the resulting envelope provided by long bursts of data. This could be computationally intensive for the purpose of real time processing and be inadequate to respond proactively to unexpected events across multiple channels. Moreover, the computation of envelopes in each of the aforementioned works is not by some means tied to the goal of computing real time dysfunctions at high sampling rates as stated in the present invention.

In one embodiment of the present invention, focus is directed to generating a real time and causal envelope calculation on large sequences of off-line temporal data. The envelope is capable of simple implementation and suitable for efficient dysfunction calculations. It is found that the maximum value at any temporal sample is effective to provide an upper bound representation for any signal. Nevertheless, the resulting envelope had a blocky shape thus resulting too rough for further practical calculations. Additionally, changes in signal signs may require a special treatment as the maximum of a negative value becomes the minimum of the value producing an undesired lower bound to the signal. The first situation may be effectively solved by recursive application of moving average operations. The second issue may be sorted out by applying the sign function operator upon each maximum calculation. Many other options are possible to preserve consistency, boundness and translation invariance to the proposed operators. Dysfunction calculations are possible by aligning the mean calculation and smoothness with the envelope calculation. Given the resulting smoothness of both envelope and mean signals it was possible to generate a corresponding smooth and dimensionless profile for dysfunctions.

The present invention provides important advantages to decrease floating point and memory costs thus enabling real time processing on instrumented measurements. Envelope and mean profiles are implicitly smoothed out by recursive application of moving averages that is more efficient than known spectral and interpolation methods. The way these two operations are defined unlocks several possibilities for defining a physical sound measurement for dysfunction. In our particular case, using a simple deviation from the mean value provides an informative and dimensionless quantity to describe dysfunctions for multiple physics such as torque, weight on bit and radial accelerations measured at different locations of the drill string.

In one embodiment of the present invention, one or more algorithms may be utilized to calculate the envelope and mean values for purposes of determining dysfunction. As set forth below MATLAB (matrix laboratory) (MathWorks), a multi-paradigm numerical computing environment and fourth-generation programming language, is utilized, which allows matrix manipulations, plotting of functions and data, implementation of algorithms, creation of user interfaces, and interfacing with programs written in other languages, including C, C++, Java, Fortran and Python. However, the below algorithms are non-limiting in terms of programming language and may be carried out by any computing environment.

The following description is based on FIGS. 1-10. The described algorithms assume the vector calculation of maximum, mean and moving average calculations. Fundamentals on time series analysis and temporal data mining can be obtained in the classical references such as Box et al., 2008 and Mitsa, 2010, respectively.

Envelope Algorithm:

```
For i = 1,2,...
    1) shift = min(w, i)
    2) l = i - shift + 1 : i
    3) y_env (i) = max(y(l))
    4) y_env (l) = moving_average(y_env (l), m)
End
```

The loop on index i sweeps each sample point in the signal represented by the vector variable y. The variable w represents a predefined window size. A trailing buffer, namely the vector variable l, of temporal sample points of size less than w is controlled by the value of variable shift. Hence, the buffer l has a maximum size of w and includes the current point as the leading one. The envelope results from the maximum value contained within the moving windows of size shift. The moving_average operation on the envelope defined within a given window is recursively applied as a new sample point in time is assimilated. This means that each point located w positions from the end of the signal is smoothed out w times. This induces an implicit way to interpolate the resulting envelope profile.

Mean Algorithm: In analogous fashion to the envelope algorithm, the mean operations computes recursively the smooth mean value in a moving window:

```
For i = 1,2,...
    1) shift = min(w, i)
    2) l = i - shift + 1 : i
    3) y_mean (i) = mean(y(l))
    4) y_mean (l) = moving_average(y_mean (l), m)
End
```

Dysfunction Algorithm:

```
For i = 1,2,...
    1) shift = min(w, i)
    2) l = i - shift + 1 : i
    3) y_dys (i) = max(|y_env (l) - y_mean (l)|./ y_mean (l))
End
```

The key operation is depicted in step 3. This represents a pointwise calculation of the ratio between the difference of the envelope and the mean value of the signal. A pointwise division over the mean is performed at each trailing point (following a Matlab programming convention, the dot "." operation emphasizes this pointwise division). Thus, the operator for the maximum operator is a vector of size (shift). The maximum operator provides a envelope for the dysfunction calculation.

In order to generate a much smoother dysfunction profile, an envelope may be suitable for relating loss of energy (amplitude) between different measurements. Picking maximum values of the dysfunction trend within a given window size provides such envelope profile as indicated at step 3 in the Dysfunction algorithm:

$$y_{dys}(i) = \max(y_{dys}(l))$$

Since the dysfunction could still be a highly oscillatory function, the present invention may further achieve a smoother representation by optionally performing moving averaging on the resulting profile:

$$y_{dys}(l) = \text{moving\_average}(y_{dys}(l), m)$$

Examples

Figure 2:
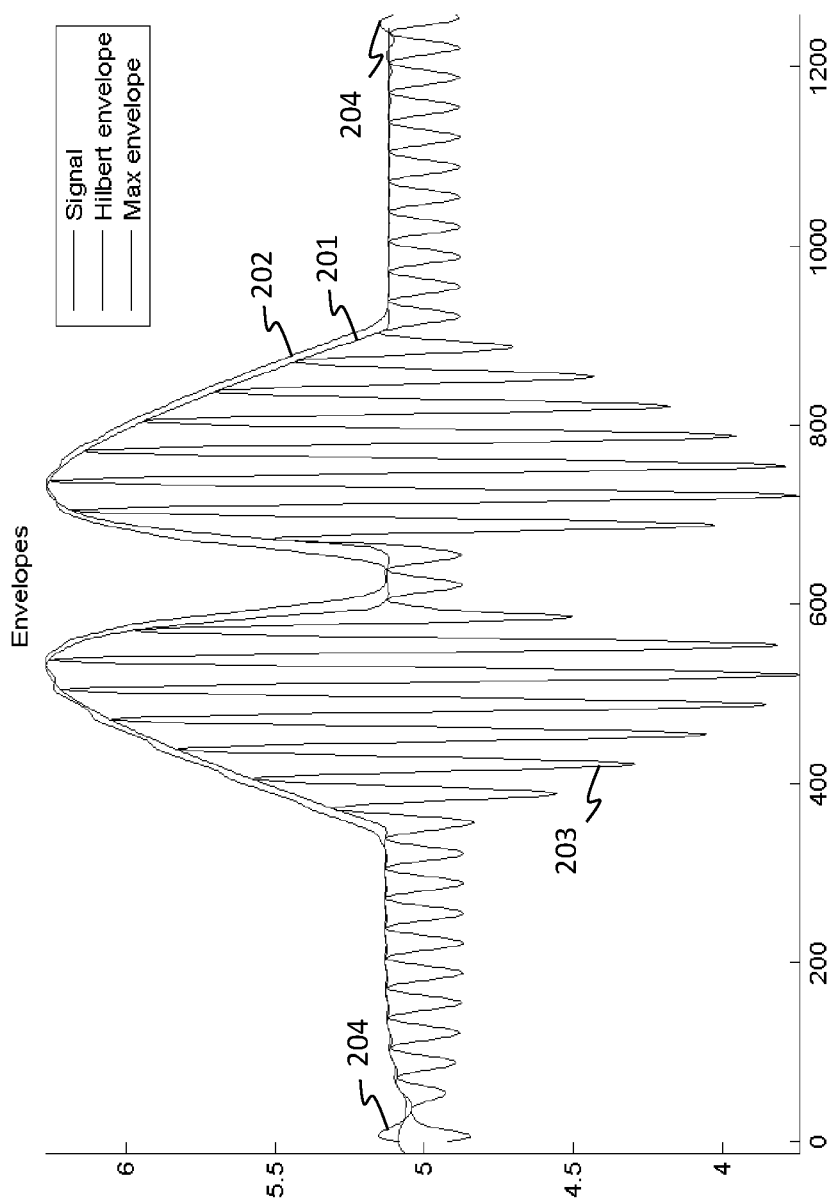
FIG. 2 depicts a transformation time data signals into envelope data using various calculations of prior art and the present invention.
Figure 3:
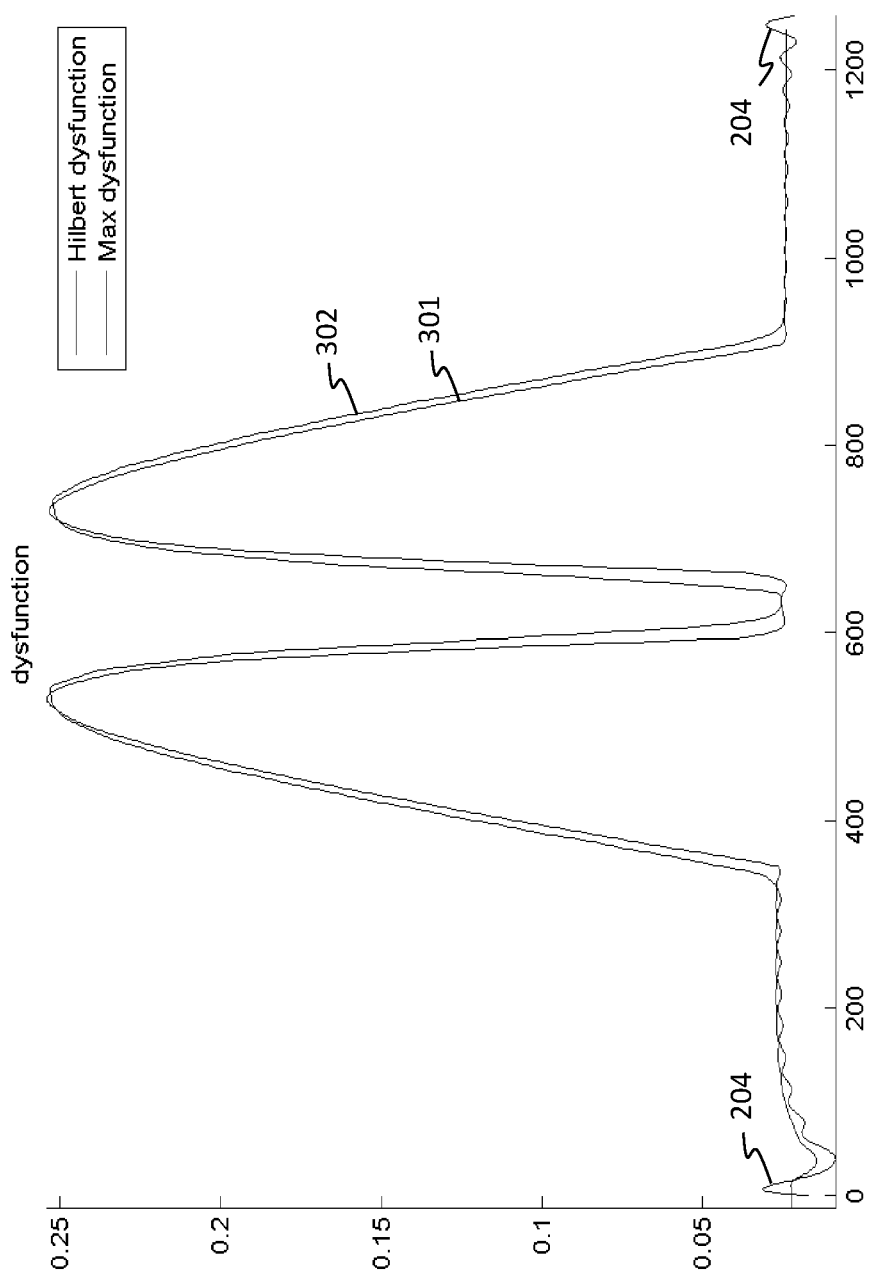
FIG. 3 depicts an exemplary dysfunction profile for the data presented in FIG. 1-2.
Figure 4:
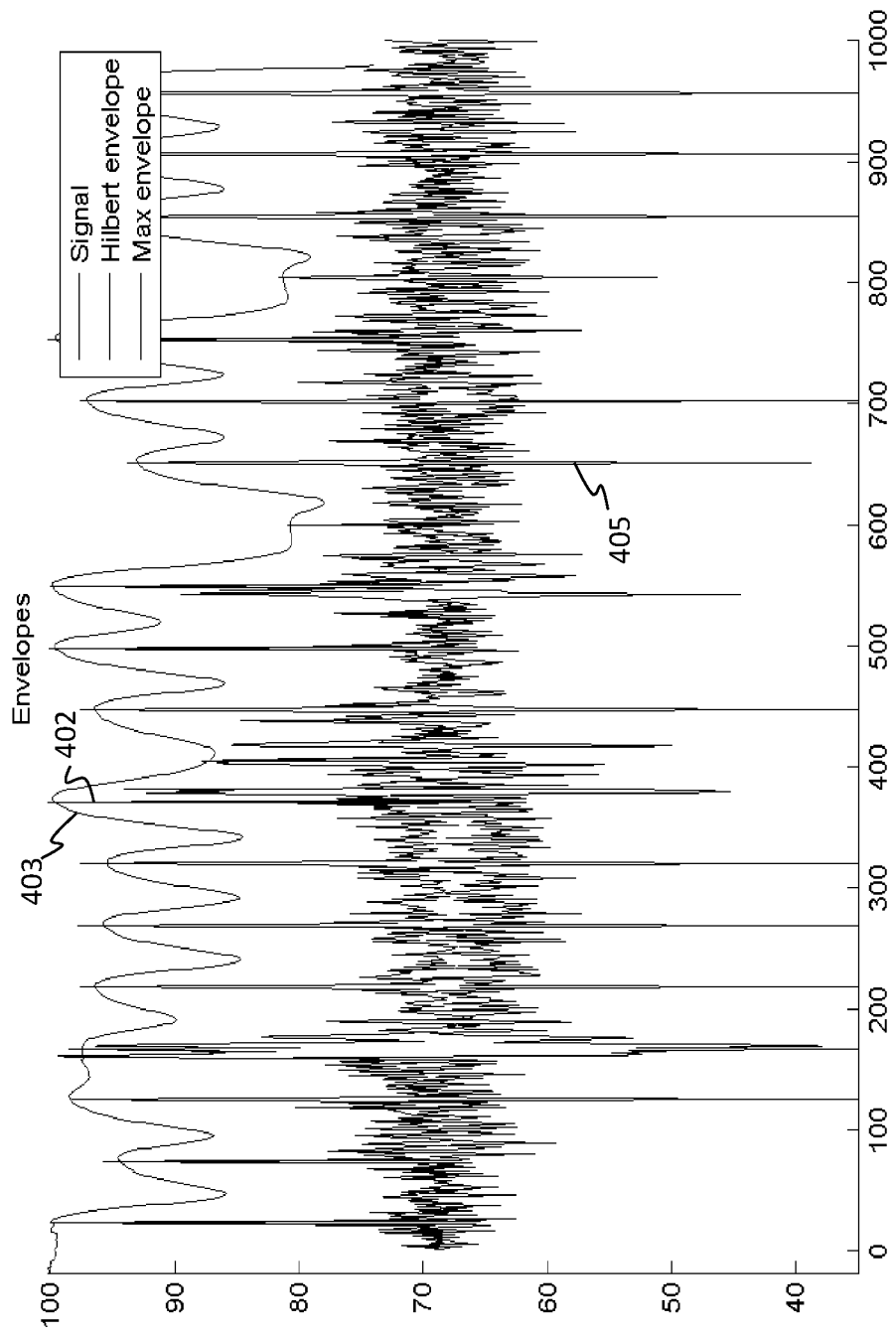
FIG. 4 depicts a series of envelope information with regard to RPM data obtained from the field.
Figure 5:
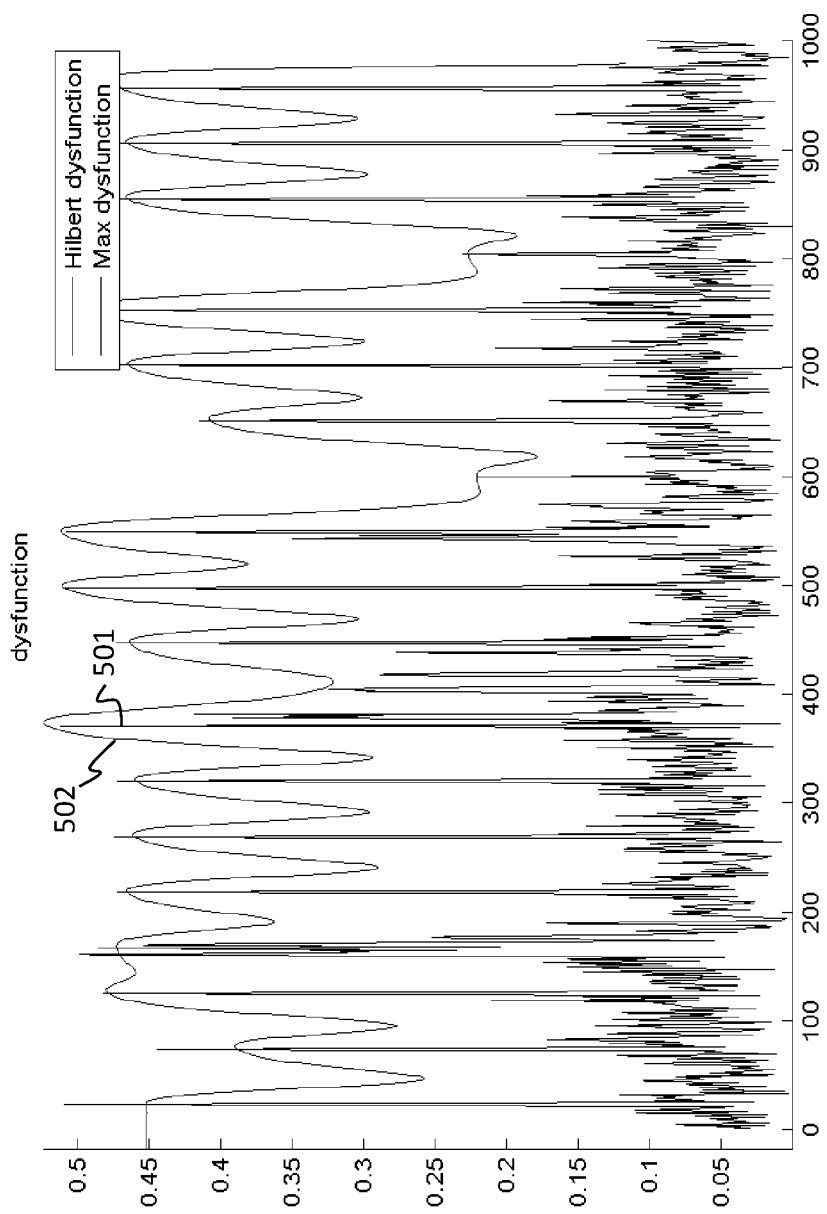
FIG. 5 depicts a transformation of RPM data signals into dysfunction data using various calculations of prior art and the present invention shown using the maximum operator (for w=40).
Figure 6:
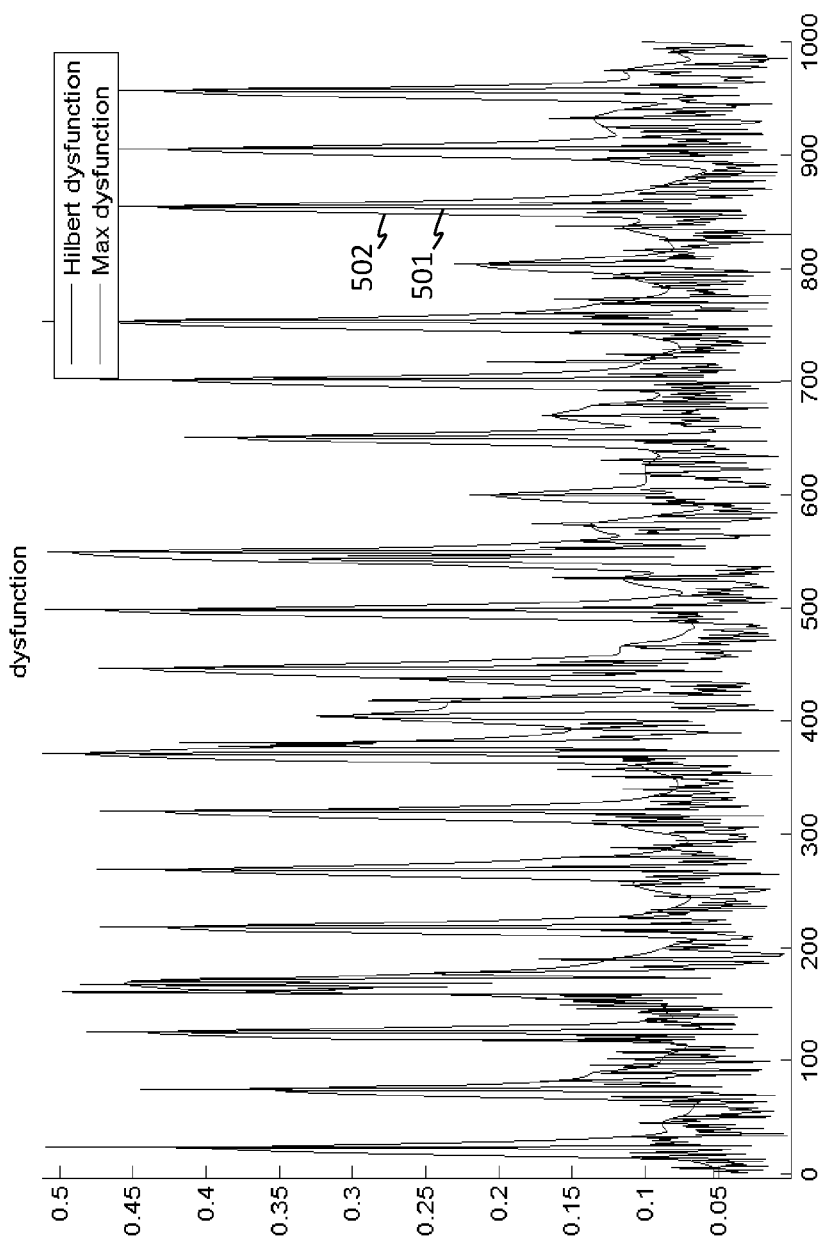
FIG. 6 depicts a transformation of RPM data signals into dysfunction data using various calculations of prior art and the present invention shown using a smaller window size (for w=10).

The examples illustrate the capabilities of the present invention on both synthetic and real field drilling data as represented by FIGS. 1-10. FIG. 1 shows a highly varying signal 104 that may be challenging for many envelope techniques proposed in the literature. The Hilbert transform is the method of choice when the complete signal is available Johanson, 1999. This solution is sought as the reference one. FIG. 2 compares the proposed methodology 202 for a signal 203 presented in a window size of w=40 against the Hilbert transform 201. Both responses are similar. However, the example illustrates one potential drawback regarding the Hilbert transform 201 when dealing with boundary values. A ringing artifact 204 is induced by truncating the transform at the edges of the signal. In contrast, the maximum operation of the present invention is insensitive to this edging effect. A slight model shift, given by the window size, can be observed upon application of the envelope and mean operators. FIG. 3 shows the resulting dysfunction profiles 301, 302 for the present invention wherein the ringing artifact 204 is further provided. FIG. 4 shows the calculation of the envelope on a real field data section having signal 405. In this case, the Hilbert transform tends to generate a more detailed envelope 402 than the present invention 403. Nevertheless, the Hilbert transform overshoots sections with lowest values (i.e., across valleys). These results are actually reflected in the corresponding dysfunction envelope depicted in FIG. 5. The dysfunction obtained by the maximum operator 502 (for w=40) provides a better representation of the overall signal behavior than the one computed from the Hilbert transform 501. If required, a smaller window size (namely w=10) would bring both dysfunction envelopes mutually closer as it can be seen in FIG. 6.

Figure 7:
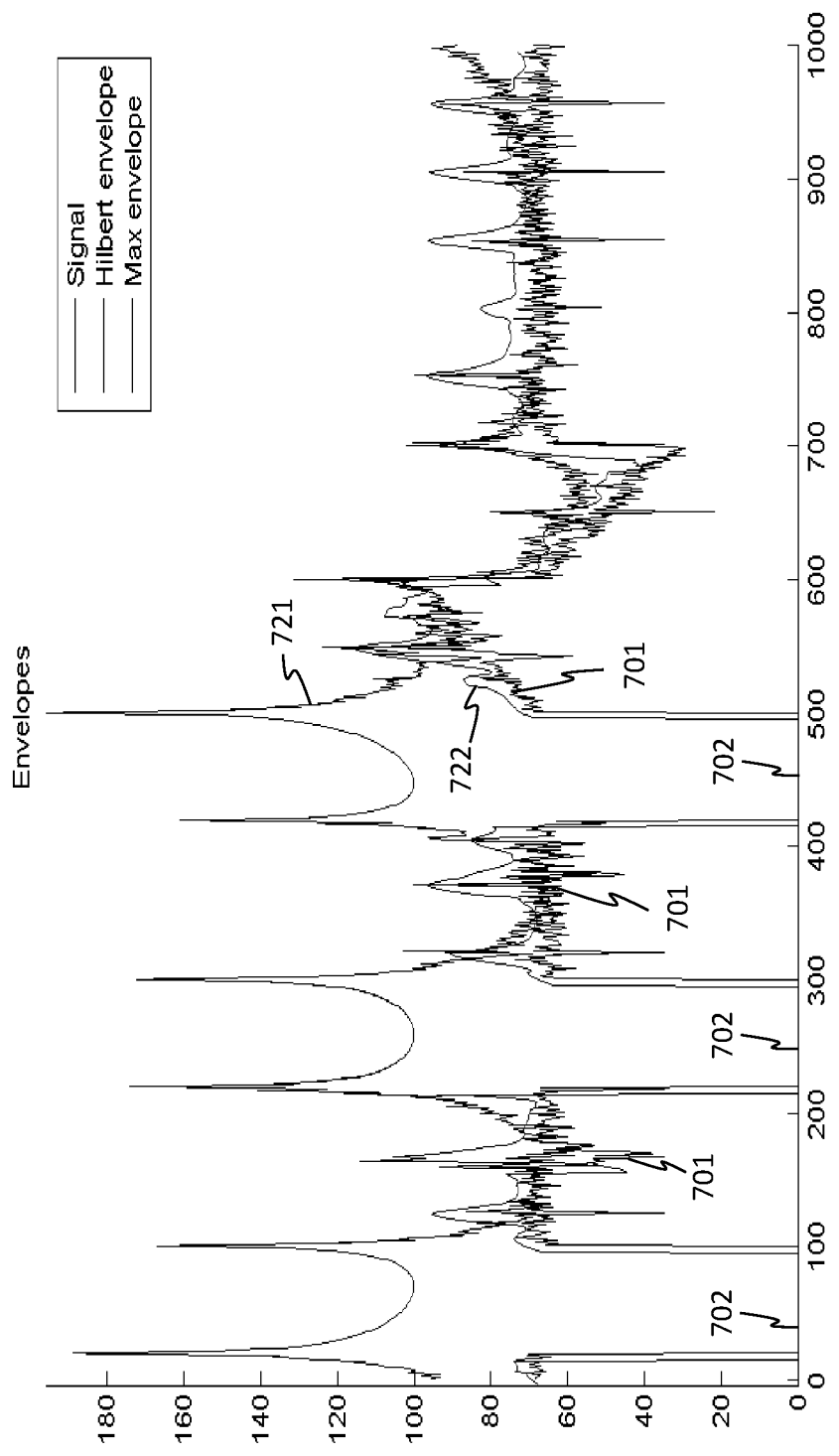
FIG. 7 depicts envelopes using various calculations of prior art and the present invention as applied to segmented data.
Figure 8A:
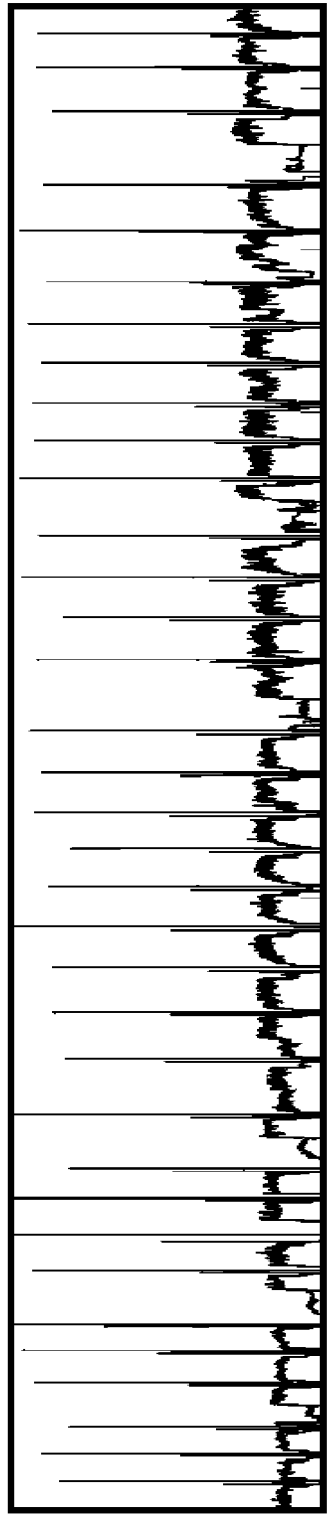
FIGS. 8A and 8B depicts envelope, mean and dysfunction profiles for more than 10,000 samples of torque data.
Figure 8B:
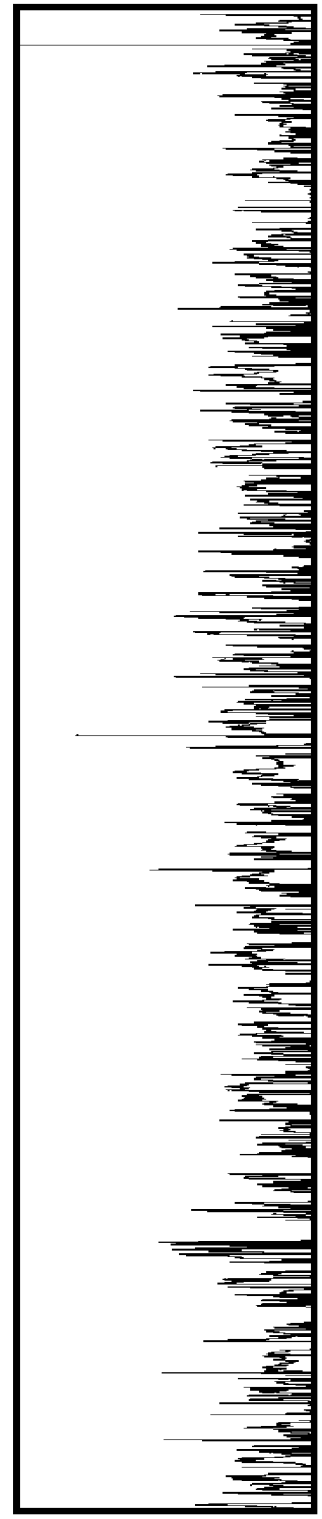
Figure 9A:
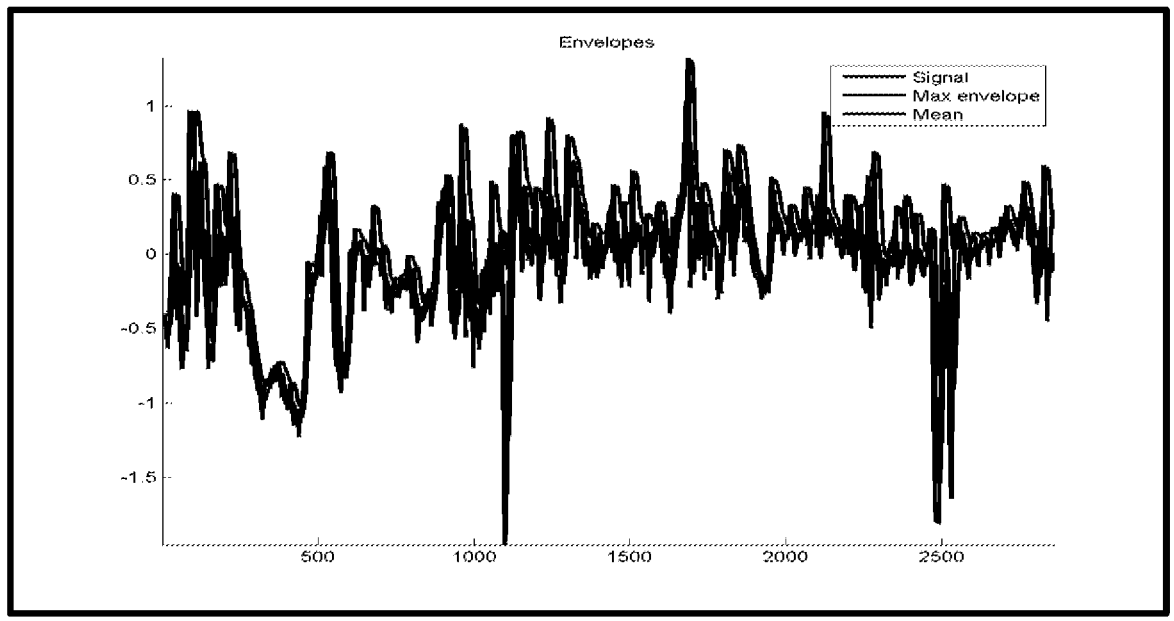
FIGS. 9A and 9B depicts the performance of the present invention when the signal displays frequent changes in sign.
Figure 9B:
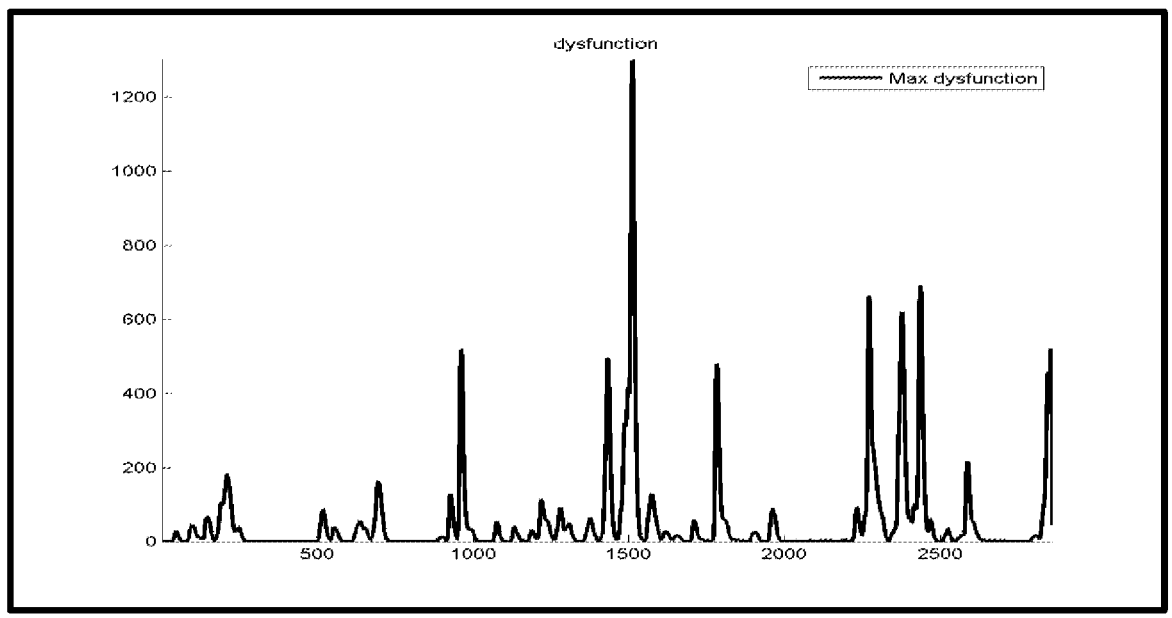

In another embodiment, the present invention is applied to segmented signal data 701 as illustrated in FIG. 7. To get these results (Max envelope 722, Hilbert envelope 721), the maximum and mean calculations are restarted whenever the signal becomes zero 702, invalid or undergo important changes in trend as it may happen when the drill bit stops, sensor measurements are somehow interrupted or the drill operates at different conditions. FIGS. 8A and 8B show how the envelope, mean and dysfunction (FIG. 8B) profiles look like on more than 10,000 samples of torque data. FIGS. 9A and 9B show the performance of the present invention when the signal displays frequent changes in sign. FIG. 10 further shows the max dysfunction performance when compared to RMS energy signals (signal 1000, RMS energy envelope 1001, Max envelope 1002, Mean 1003). A correction based on the sign function is used to keep the consistency of calculations. Note that when the RMS energy criteria for computing envelopes is employed, negative values are overshot.

Figure 11:
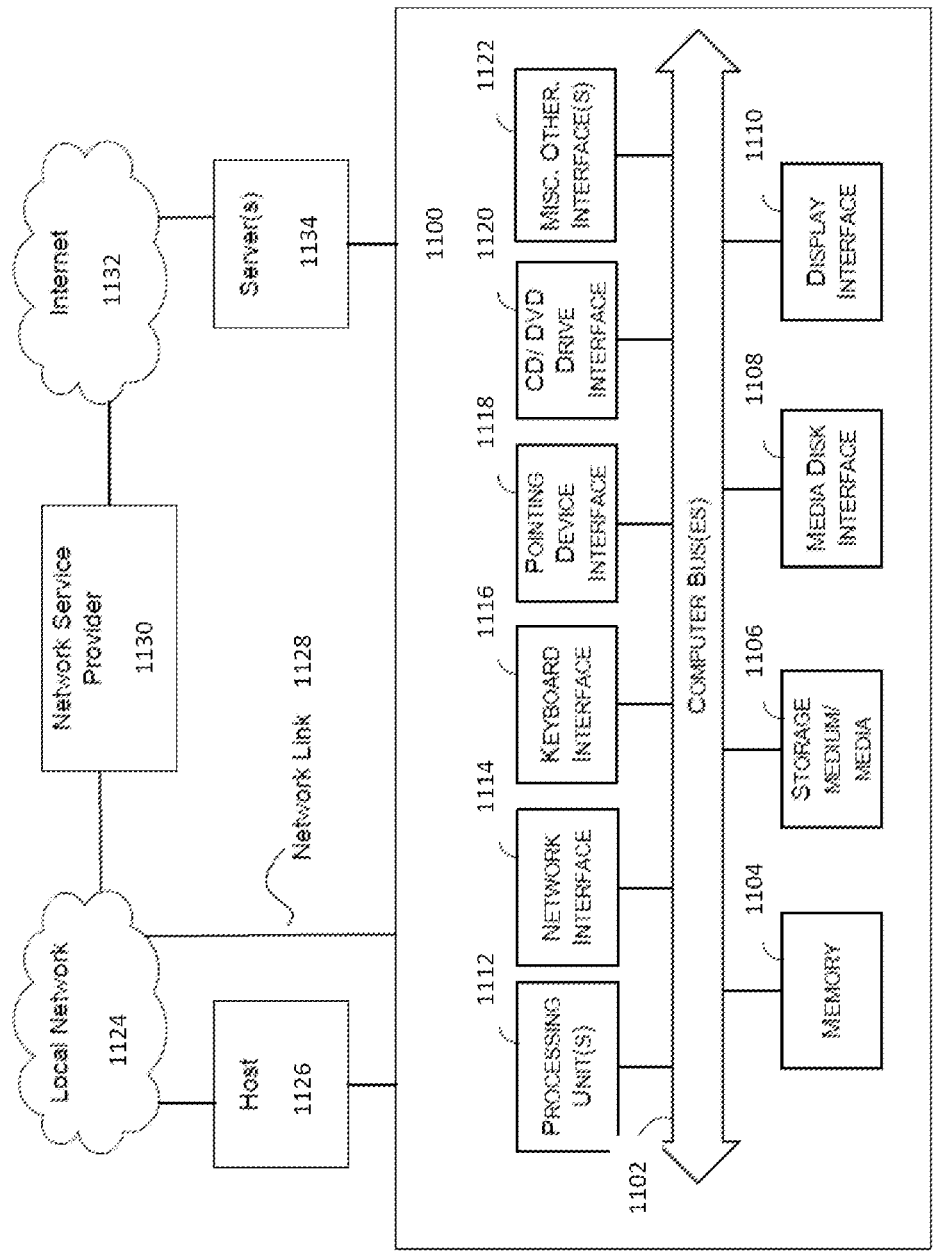
FIG. 11 depicts a block diagram illustrating architecture of a hardware device in accordance with one or more embodiments of the present invention.

As shown in FIG. 11, internal architecture 1100 of a computing device(s), computing system, computing platform and the like for purposes of calculating and presenting the data presented by the present invention includes one or more processing units, processors, or processing cores, (also referred to herein as CPUs) 1112, which interface with at least one computer bus 1102. Also interfacing with computer bus 1102 are computer-readable medium, or media, 1106, network interface 1114, memory 1104, e.g., random access memory (RAM), run-time transient memory, read only memory (ROM), media disk drive interface 1120 as an interface for a drive that can read and/or write to media including removable media such as floppy, CD-ROM, DVD, media, display interface 1110 as interface for a monitor or other display device 1122, keyboard interface 1116 as interface for a keyboard, pointing device interface 1118 as an interface for a mouse or other pointing device, and miscellaneous other interfaces not shown individually, such as parallel and serial port interfaces and a universal serial bus (USB) interface.

Memory 1104 interfaces with computer bus 1102 so as to provide information stored in memory 1104 to CPU 1112 during execution of software programs such as an operating system, application programs, device drivers, and software modules that comprise program code, and/or computer executable process steps, incorporating functionality described herein, e.g., one or more of process flows described herein. CPU 1112 first loads computer executable process steps from storage, e.g., memory 1104, computer readable storage medium/media 1106, removable media drive 1108, and/or other storage device. CPU 1112 can then execute the stored process steps in order to execute the loaded computer-executable process steps. Stored data, e.g., data stored by a storage device, can be accessed by CPU 1112 during the execution of computer-executable process steps.

Persistent storage, e.g., medium/media 1106, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 1128 typically provides information communication using transmission media through one or more networks to other devices that use or process the information. For example, network link 1128 may provide a connection through local network 1124 to a host computer 1126 or to equipment operated by a Network or Internet Service Provider (ISP) 1130. ISP equipment in turn provides data communication services through the public, worldwide packet-switching communication network of networks now commonly referred to as the Internet 1132.

A computer called a server host 1134 connected to the Internet 1132 hosts a process that provides a service in response to information received over the Internet 1132. For example, server host 1134 hosts a process that provides information representing video data for presentation at display 1110. It is contemplated that the components of system 1100 can be deployed in various configurations within other computer systems, e.g., host and server.

At least some embodiments of the present disclosure are related to the use of computer system 1100 for implementing some or all of the techniques described herein. According to one embodiment, those techniques are performed by computer system 1100 in response to processing unit 1112 executing one or more sequences of one or more processor instructions contained in memory 1104. Such instructions, also called computer instructions, software and program code, may be read into memory 1104 from another computer-readable medium 1106 such as storage device or network link. Execution of the sequences of instructions contained in memory 1104 causes processing unit 1112 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 1100. Computer system 1100 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 1102 as it is received, or may be stored in memory 1104 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

Caetano M. and X. Rodet. Improved Estimation of the Amplitude Envelope of Time-Domain Signals using True Envelope Cepstral Smoothing, IEEE Int. Conf. on Acoustics, Speech and Signal Processing, Czech Republic, 2011.

Johansson, M. The Hilbert Transform, Master Thesis, Dept. Mathematics, Vaxjo University, 1999.

Jonsson, P. and L. Eklund. TIMESAT—A Program for Analysing Time-Series of Satellite Sensor Data. Computer Geosciences, 2004.

Gupta, M., C. C. Aggarwal and J. Han. Outlier Detection for Temporal Data: A Survey. IEEE Transactions on Knowledge and Data Engineering, Vol. 25, N. 1, 2013.

Mitsa, T. Temporal Data Mining, Chapman & Hall, 2010.

Box, G. E. P., G. M. Jenkins and G. C. Reinsel. Time Series Analysis. Wiley, 4th Ed., 2008.

Hertz, 2012 U.S. Pat. No. 8,214,163 B2

What is claimed is:

1. A method for real-time drilling dysfunction, the method comprising:
   determining, via a computing device operably coupled to a drill string, an amplitude envelope and an envelope function from a recursive application of a maximum signal value within a given window size;
   configuring, via the computing device, a mean function for estimating a normal state of the signal within the window size;
   determining, in real time via the computing device, a dysfunction operator to generate a dysfunction profile by generating a comparison of the envelope function to the mean function;
   mapping, via the computing device, various attributes of the comparison to create a mapped comparison; and
   optimizing, via the computing device, one or more parameters of a drilling operation using the mapped comparison.

2. The method of claim 1, further comprising;
   determining, via the computing device, dysfunctions for detecting drilling equipment failure.

3. The method of claim 1, wherein the signal comprises streaming data.

4. The method of claim 1, wherein the signal is selected from the group consisting of axial vibration, down-hole RPM, down-hole torque, gravitational acceleration, centripetal acceleration, radial acceleration, tangential acceleration, distance from surface, surface RPM, surface torque, hole depth, or rig state.

5. The method of claim 1, wherein the signal is obtained from one or more downhole tri-axial accelerometers.

6. The method of claim 1, wherein the one or more parameters of the drilling operation are toque, weight on bit, and/or radial acceleration at one or more location on the drill string.

7. A system for optimizing drilling operations, the system comprising:
   one or more sensors configured to provide a signal in a well;
   a processor; and
   a non-transitory storage medium with program logic tangibly stored thereon that, when executed by the processor, causes the processor to:
   determine an amplitude envelope and an envelope function from a recursive application of a maximum signal value within a given window size;
   configure a mean function for estimating a normal state of the signal within the window size;
   determine, in real time, a drilling dysfunction operator to generate a drilling dysfunction profile by generating a comparison of the envelope function to the mean function;
   map various attributes of the comparison to create a mapped comparison; and
   apply the drilling dysfunction profile to an activity producing the signal to optimize one or more parameter of a drilling operation of the drilling equipment.

8. The system of claim 7, wherein the program logic further causes the processor to determine dysfunctions for detecting drilling equipment failure.

9. The system of claim 7, wherein the signal comprises streaming data.

10. The system of claim 9, wherein the program logic further causes the processor to compute a real time drilling dysfunction.

11. The system of claim 7, wherein the signal is selected from the group consisting of axial vibration, down-hole RPM, down-hole torque, gravitational acceleration, centripetal acceleration, radial acceleration, tangential acceleration, distance from surface, surface RPM, surface torque, hole depth, or rig state.

12. The system of claim 7, wherein the signal is obtained from one or more downhole tri-axial accelerometers.

13. The system of claim 7, wherein the one or more parameters of the drilling operation are toque, weight on bit, and/or radial acceleration at one or more location on the drilling equipment.

* * * * *